United States Patent [19]

Park

[11] Patent Number: 5,012,796
[45] Date of Patent: May 7, 1991

[54] SOLAR HEAT COLLECTOR

[76] Inventor: Philip E. Park, 1510 Second Ave., Walnut Creek, Calif. 94596

[21] Appl. No.: 239,946

[22] Filed: Sep. 2, 1988

[51] Int. Cl.$^5$ .............................................. F24J 2/42
[52] U.S. Cl. ................................... 126/416; 126/415; 126/448
[58] Field of Search ............... 126/415, 416, 448, 442; 4/493, 506, 507

[56] References Cited

U.S. PATENT DOCUMENTS

| | | | |
|---|---|---|---|
| 1,802,635 | 4/1931 | Eaton | 126/448 |
| 3,399,664 | 9/1968 | Suhay | 126/416 |
| 3,868,945 | 3/1975 | Konopka et al. | 126/416 |
| 4,054,987 | 10/1977 | Forlenza | 272/3 |
| 4,187,901 | 2/1980 | Coleman et al. | 126/448 |
| 4,333,186 | 6/1982 | Lankheet | 126/416 |
| 4,381,763 | 5/1983 | Kahl | 126/416 |
| 4,406,278 | 9/1983 | Demmer | 126/416 |
| 4,414,960 | 11/1983 | Wasserman | 126/448 |
| 4,474,168 | 10/1984 | Pettit | 126/416 |
| 4,510,920 | 4/1985 | Walmet | 126/415 |

FOREIGN PATENT DOCUMENTS

| | | | |
|---|---|---|---|
| 2526924 | 11/1983 | France | 126/415 |
| 2099984 | 12/1982 | United Kingdom | 126/416 |

Primary Examiner—Henry A. Bennet
Assistant Examiner—Denise L. F. Gromada

[57] ABSTRACT

A solar heat collector is described comprising, in combination, a plurality of fluid conduits and a mat formed of intersecting ribs and posts that provide a support surface as for a decking. One end of each post projects downward and below the intersecting ribs to form open channels between posts. The fluid conduits extend beneath the mat and are located in the channels. Each fluid conduit connects with a pair of headers which extend along opposite sides of the mat, and a pump circulates water taken from a reservoir, such as a swimming pool.

2 Claims, 2 Drawing Sheets

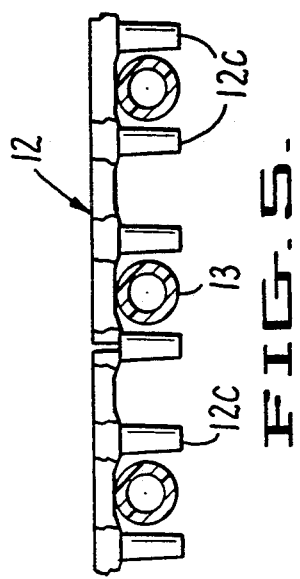
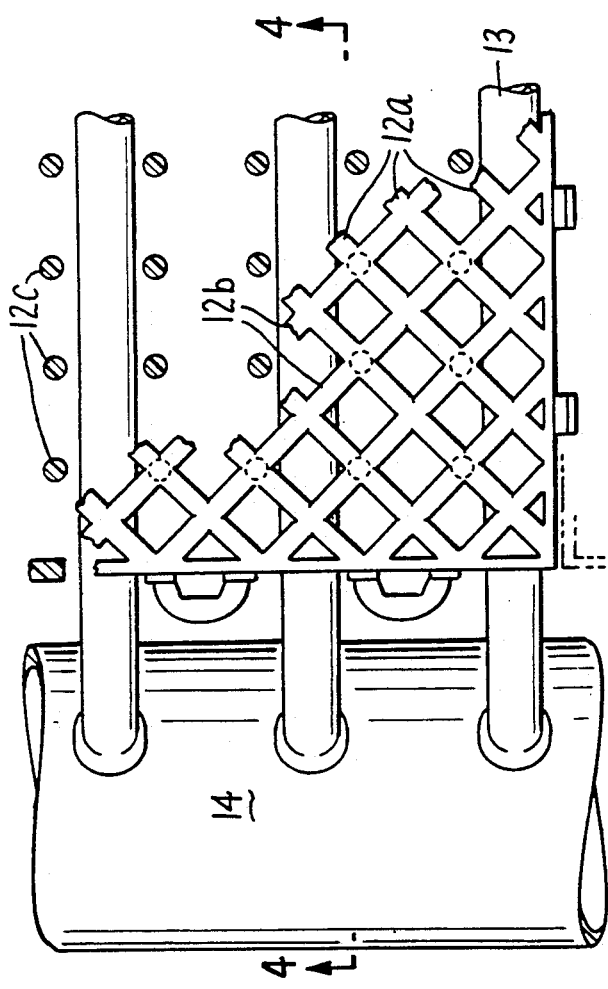
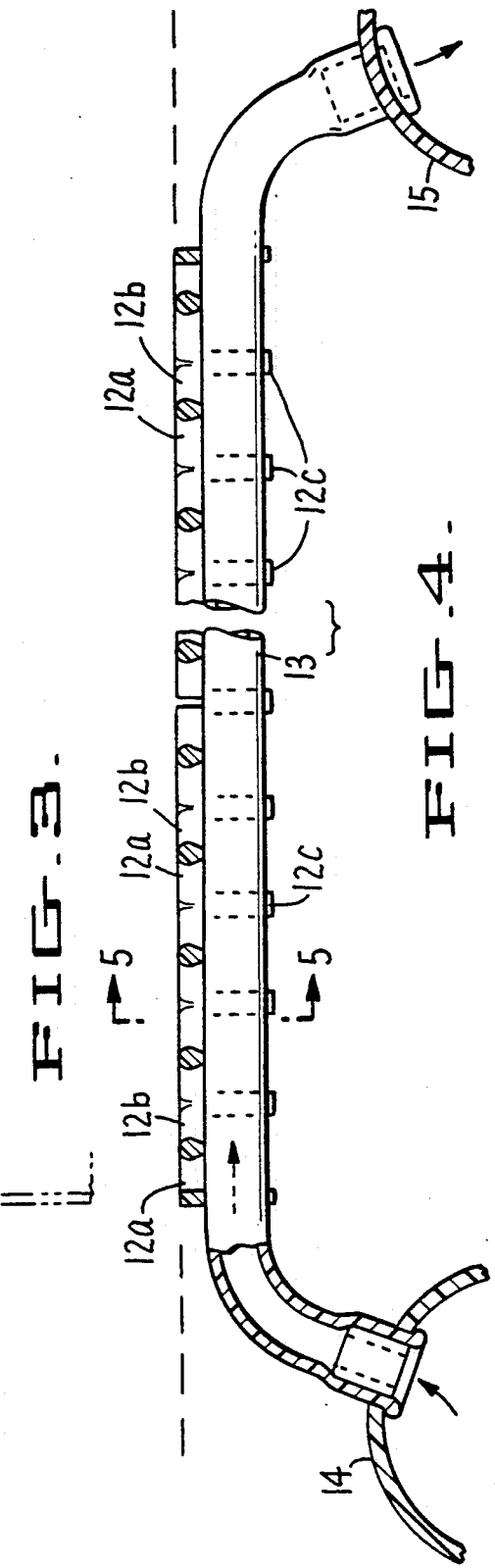

SOLAR HEAT COLLECTOR

SUMMARY OF THE INVENTION

This application and invention relates generally to solar heat collectors and more particularly to the combination of fluid conduits and a mat which serves as a decking or support surface and as a housing for a plurality of fluid conduits. The solar heat collector has particular application for heating the water of a swimming pool and also providing an attractive decking or court adjacent, around, or in close proximity to the swimming pool.

DESCRIPTION OF THE DRAWINGS

In the drawings forming a part of this application and in which like parts are identified by like reference numerals.

FIG. 3 is a top plan view and detail showing the mat and fluid conduits;

FIG. 4 is a section taken on the line 4—4 of FIG. 3; and

FIG. 5 is an enlarged vertical section taken on the line 5—5 of FIG. 4.

DETAILED DESCRIPTION OF INVENTION

Figure 1:
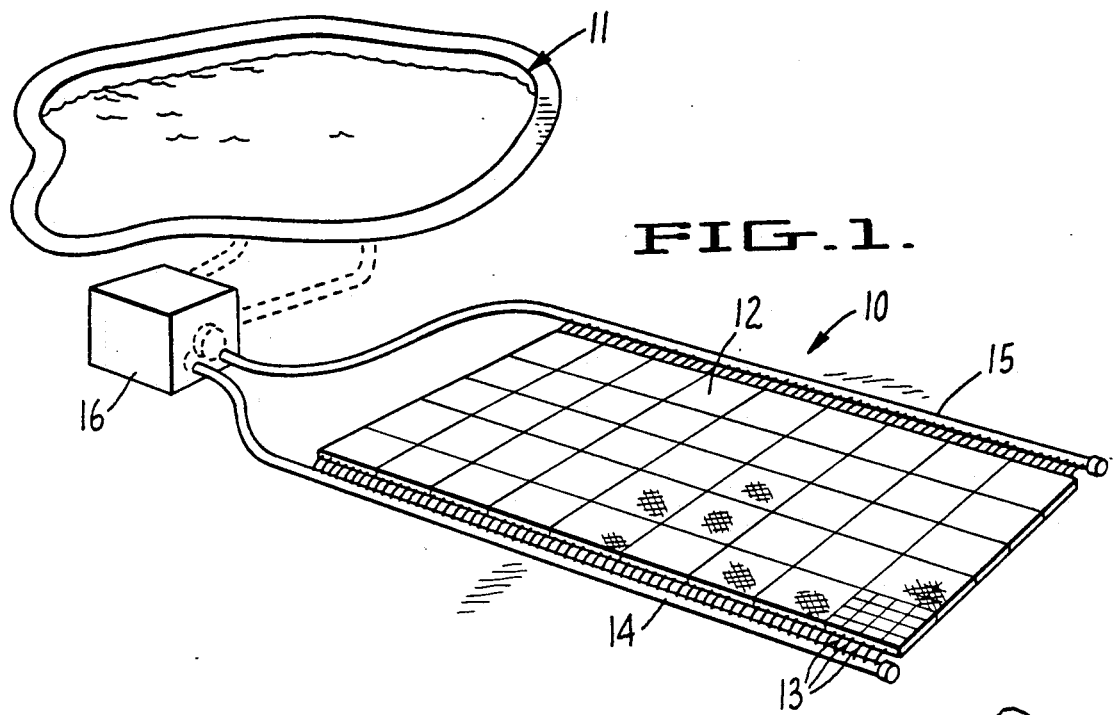
FIG. 1 illustrates a preferred embodiment of the invention in a solar collector positioned adjacent a swimming pool.
Figure 2:
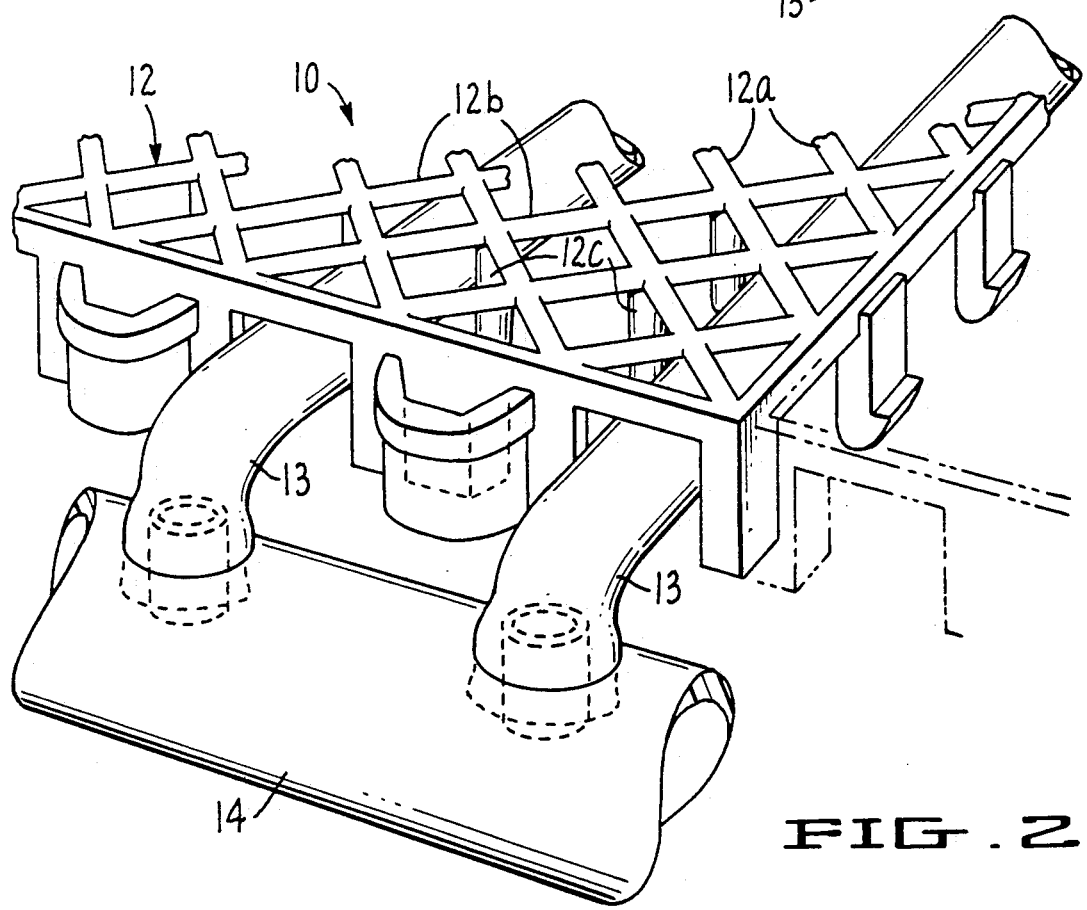
FIG. 2 is a perspective view and detail showing the mat construction and the housing arrangement of fluid conduits.

Referring to FIG. 1, a solar collector 10 is shown in conjunction with its application and use for heating the water of a swimming pool 11. Collector 10 essentially comprises a mat 12, a plurality of fluid conduits 13 and a pair of headers 14 and 15. A pump 16 takes water from the swimming pool 11, introduces relatively cool water into header 14, which is then passed through conduits 13, and withdraws heated water from header 15, discharging the heated water back into the swimming pool.

This invention particularly contemplates a mat construction that may be used as a decking or support surface adjacent the pool and also one which can house a plurality of fluid conduits which serve as collectors of solar heat. A mat of this kind is shown and described in U.S. Pat. No. 4,054,987.

Referring to FIGS. 2-5 the mat is formed of integral intersecting ribs 12a and 12b and posts 12c. One end of each post and one side of each rib are joined in substantially coplanar relation and define a support surface. The end opposite to the connected end of each post projects downward and below the intersecting ribs. The posts are arranged in a pattern of squares, one post being located at the corner of each square, and define columns of posts spaced substantially equal distances apart. This arrangement of posts provides passageways or channels, which receive and house fluid conduits 13.

Although a preferred embodiment of the invention has been illustrated and described, various modifications and changes may be resorted to without departing from the spirit of the invention or scope of the appended claims, and each of such modifications and changes is contemplated.

What is claimed is:

1. A solar heat collector comprising in combination, a mat formed of integral intersecting ribs and posts, one end of each post and one side of each rib being substantially co-planar and defining a support surface, the end opposite to said one end of each post projecting downward and below said intersecting ribs to form open channels between said posts;

a plurality of fluid conduits extending beneath said mat and located in channels between said posts;

and a pair of headers extending along one or more sides of said mat fluidly connected, respectively, to opposite ends of said fluid conduits;

whereby fluid may be introduced into one header, passed through said conduits and withdrawn through a second header.

2. The solar collector of claim 1 in combination with a swimming pool, said mat functioning as a decking adjacent the pool and as a housing for said fluid conduits.

* * * * *